Patented Jan. 21, 1947

2,414,633

UNITED STATES PATENT OFFICE 2,414,633

PORCELAIN ENAMEL

Eugene E. Bryant, Bedford, Ohio, assignor to Ferro Enamel Corporation, Cleveland, Ohio, a corporation of Ohio No Drawing. Application January 15, 1944, Serial No. 518,408

12 Claims. (Cl. 106—48)

This invention relates as indicated to porcelain enamels and more especially to white enamels which may be applied directly to ferrous articles such as sheet steel.

In the art of applying porcelain enamel one of the principal problems is that of securing a satisfactory bond between the enamel and the metal. In order to secure such satisfactory bond it becomes necessary to include in the enamel mixture a component, the best known of which at the present time is cobalt oxide. While cobalt oxide is very effective to insure proper bond between the enamel and the metal it, nevertheless, imparts a deep blue color to the enamel and accordingly, when a white ultimate finish is desired, it becomes necessary to use a so-called ground coat and a superimposed finish coat, the former being blue and the latter being white.

I have discovered, however, that other materials may be used for the purpose of insuring bond between the enamel and the metal, which materials do not discolor the enamel so that a white finish may be produced by the first coat applied to the metal base.

It is a principal object of my invention to provide enamel compositions of the character described.

Other objects of my invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the discovery that a satisfactory, white, porcelain enamel, suitable for application directly to ferrous metal pieces, may have such characteristic imparted thereto by the conjoint presence therein of antimony and molybdenum.

It has been found that this conjoint presence of antimony and molybdenum is effective for the stated purpose in a wide variety of enamel compositions. As illustrative of one range of compositions within which the conjoint presence of antimony and molybdenum has been found particularly effective, reference may be had to the following table:

Table 1

| | Percent |
|---|---|
| Silica | 10 to 50 |
| Dehydrated borax | 11 to 16 |
| Feldspar | 0 to 30 |
| Soda ash | 0 to 10 |
| Sodium nitrate | 1 to 6 |
| Fluorspar | 0 to 10 |
| Cryolite | 0 to 10 |
| Barium carbonate | 5 to 30 |
| Calcspar | 0 to 10 |
| Sodium silicofluoride | 0 to 10 |
| Antimony trioxide | .5 to 7 |
| Molybdenum trioxide | 1.5 to 10 |
| Titanium dioxide | 0 to 10 |

The foregoing is a table of the ranges of percentages within which the various raw batch constituents may be combined in providing improved enamels in accordance with my invention. These enamels are smelted in the usual way at temperatures of from 2000° F. to 2100° F. for periods of from 60 minutes to 90 minutes, depending on the particular composition selected for use.

After the enamel has thus been smelted, the calculated oxide content will lie within the ranges given in the following table:

Table 2

| | Parts by weight |
|---|---|
| $SiO_2$ | 20 to 50 |
| $B_2O_3$ | 7 to 14 |
| $Al_2O_3$ | 0 to 10 |
| $Na_2O$ | 6 to 15 |
| $K_2O$ | 1 to 3 |
| $CaO$ | 2 to 10 |
| $Sb_2O_3$ | .5 to 7 |
| $MoO_3$ | 1.5 to 10 |
| $F_2$ | 2 to 8 |
| $BaO$ | 3.5 to 23 |
| $TiO_2$ | 0 to 10 |

Illustrative examples of raw batch compositions of enamels which have been found particularly desirable as white enamels for direct application to sheet steel are the four examples found in the following table:

Table 3

|  | Example | | | |
|---|---|---|---|---|
|  | A | B | C | D |
|  | Per cent | Per cent | Per cent | Per cent |
| Silica | 12.4 | 12.2 | 16.8 | 16.8 |
| Borax—dehydrated | 16.4 | 16.0 | 18.8 | 18.8 |
| Feldspar | 25.7 | 25.2 | 17.3 | 17.3 |
| Soda ash | | | 3.3 | 3.3 |
| Soda nitrate | 2.1 | 2.1 | 3.5 | 3.5 |
| Fluorspar | 5.5 | 5.4 | 8.1 | 8.1 |
| Cryolite | 4.9 | 4.7 | 4.3 | 4.3 |
| Barium carbonate | 22.8 | 22.3 | 20.5 | 20.5 |
| Calcspar | 4.6 | 4.5 | | |
| Antimony trioxide | 1.3 | 1.3 | 1.2 | 3.4 |
| Molybdenum trioxide | 4.3 | 6.3 | 6.2 | 4.0 |

The calculated oxide content of each of the four examples given in Table 3 above are given in the following table:

Table 4

|  | Example | | | |
|---|---|---|---|---|
|  | A | B | C | D |
|  | Parts by weight | Parts by weight | Parts by weight | Parts by weight |
| $SiO_2$ | 30.1 | 29.7 | 28.8 | 28.8 |
| $B_2O_3$ | 11.4 | 11.1 | 13.0 | 13.0 |
| $Al_2O_3$ | 5.8 | 5.7 | 4.2 | 4.2 |
| $Na_2O$ | 8.7 | 8.5 | 11.4 | 11.4 |
| $K_2O$ | 2.5 | 2.5 | 1.7 | 1.7 |
| $CaO$ | 6.5 | 6.4 | 5.8 | 5.8 |
| $Sb_2O_3$ | 1.3 | 1.3 | 1.2 | 3.4 |
| $MoO_3$ | 4.3 | 6.3 | 6.2 | 4.0 |
| $F_2$ | 5.3 | 5.2 | 6.2 | 6.2 |
| $BaO$ | 17.5 | 17.2 | 16.1 | 16.1 |

It will be observed that each of the examples given above are characterized by the fact that they have a relatively high barium content, greater than the antimony and molybdenum together and greater than the borax. The presence of a substantial amount of barium in an enamel tends to produce a "soft" enamel, and accordingly it has been found that my invention is particularly applicable for use with so-called "soft" enamels.

It will generally be found that best results are secured if the total antimony and molybdenum content (calculated as the trioxide) lies between 2% and 17% of the total batch, generally best results being secured when from 4% to 8% is used.

Improved results will generally be secured if there is maintained a proportional relationship between the antimony and molybdenum. Such proportional relationship extends from one part of antimony to ten parts molybdenum, to two parts of antimony to one part of molybdenum (calculated as the trioxides). Within the narrower range of from one part of antimony to five parts of molybdenum, to equal parts of each, generally superior results will be secured.

The table of ranges of raw batch mixtures and specific examples of raw batch mixtures may be varied considerably by the use of other available raw materials to provide the indicated desirable oxide content. For example, other molybdenum compounds and other antimony compounds may be used, instead of the ones specifically indicated. Similarly, potash may be substituted for soda, and the fluorine may be supplied by sodium silico-fluoride.

All of these variables, and the manner in which these variations may be made in arriving at the indicated desirable oxide content of the resultant smelt, are expedients well-known to those skilled in the art, and a more detailed explanation of this phase of the invention is believed unnecessary.

I have found that desirable results can be secured by the use of the stated conjoint amounts of antimony and molybdenum in the so-called "acid-resistant" types of enamel. However, in such type of enamel, the total concentration of antimony and molybdenum will be at the upper end of the ranges indicated, and generally best results will be secured if these two components are used in about equal amounts.

After a frit of the enamel has been prepared in the manner indicated, a slip for application to the work is prepared by utilizing any of the given enamels as one of the mill charges in a typical mill batch as indicated by the following table:

Table 5

| | Parts by weight |
|---|---|
| Frit | 100 |
| Clay | 6 |
| Sodium nitrite | .25 |
| Zirconium base opacifier (Patent No. 2,189,148) | 4 |
| Water | 40 |

This mill charge will preferably be ground in a conventional ball mill for a period of about five hours, or preferably until the slip has a fineness such that a one to two gram residue will remain on a 200 mesh sieve from a 50 cc. sample.

The enamel as thus prepared is applied to the work by any conventional manner as by draining, dipping, or spraying, and generally best results will be secured if the total weight of application per square foot of area covered is from 25 grams to 40 grams, dry weight. The enamel after being applied is dried in the conventional manner, and then fired at a temperature of from about 1440° F. to about 1500° F. for an interval of time which is determined to a certain extent by the character of the metal base to which the enamel is applied. When, for example, 20-gauge sheet iron is being enameled, the porcelain enamels of my invention will generally fire out satisfactorily in two minutes to five minutes at the temperatures given above.

No particular precaution need be observed in the preparation of the metallic base to receive the enamel, excepting that it be thoroughly cleaned as by pickling, neutralizing, and drying.

By utilizing the enamels of my invention, it is possible to secure an excellent white finish coat having a reflectance of about 64% when applied at 30 grams per square foot, dry weight.

Other modes of applying the principle of the invention may be employed, change being made as regards the details described, provided the features stated in any of the following claims, or the equivalent of such, be employed.

I therefore particularly point out and distinctly claim as my invention:

1. A substantially white porcelain enamel characterized by its suitability for application directly to ferrous work pieces, such characteristic being imparted thereto by the presence therein of antimony and molybdenum with barium in greater amount, calculated as oxide, than the antimony and molybdenum calculated as oxides and greater than boron oxide.

2. A substantially white porcelain enamel characterized by its suitability for application directly to ferrous work pieces, such characteristic being imparted thereto by the presence therein of minor amounts of compounds of antimony and molybdenum with barium in greater amount, calculated as oxide, than the antimony and molybdenum calculated as oxides and greater than boron oxide.

3. A substantially white porcelain enamel characterized by its suitability for application directly to ferrous work pieces, such characteristic being imparted thereto by the presence therein of a total of from 2% to 17% of compounds of antimony and molybdenum in a ratio of from 1 antimony to 10 molybdenum, to 2 antimony to 1 molybdenum calculated as the trioxides with barium in greater amount, calculated as oxide, than the antimony and molybdenum oxides together and greater than boron oxide.

4. A substantially white porcelain enamel characterized by its suitability for application directly to ferrous work pieces, such characteristic being imparted thereto by the presence therein of a total of from 4% to 8% of compounds of antimony and molybdenum in a ratio of from 1 antimony to 5 molybdenum, to equal parts of each, calculated as the trioxides with barium in greater amount, calculated as oxide, than the antimony and molybdenum oxides together and greater than boron oxide.

5. A porcelain enamel frit of the character produced by smelting a raw batch mixture comprising about:

| | Per cent |
|---|---|
| Silica | 10 to 50 |
| Dehydrated borax | 11 to 16 |
| Feldspar | 0 to 30 |
| Soda ash | 1 to 10 |
| Sodium nitrate | 0 to 6 |
| Fluorspar | 0 to 10 |
| Cryolite | 0 to 10 |
| Barium carbonate | 5 to 30 |
| Calcspar | 0 to 10 |
| Sodium silicofluoride | 0 to 10 |
| Antimony trioxide | .5 to 7 |
| Molybdenum trioxide | 1.5 to 10 |
| Titanium dioxide | 0 to 10 | the barium carbonate being greater in amount than the antimony and molybdenum oxides together and greater than boron oxide.

6. A porcelain enamel frit of the character produced by smelting a raw batch mixture, the calculated oxide content of which comprises about:

| | Parts by weight |
|---|---|
| $SiO_2$ | 20 to 50 |
| $B_2O_3$ | 7 to 14 |
| $Al_2O_3$ | 0 to 10 |
| $Na_2O$ | 6 to 15 |
| $K_2O$ | 1 to 3 |
| CaO | 2 to 10 |
| $Sb_2O_3$ | .5 to 7 |
| $MoO_3$ | 1.5 to 10 |
| $F_2$ | 2 to 8 |
| BaO | 3.5 to 23 |
| $TiO_2$ | 0 to 10 | the BaO being greater in amount than the $Sb_2O_3$ and $MoO_3$ together and greater than boron oxide.

7. A porcelain enamel frit of the character produced by smelting a raw batch mixture comprising about:

| | Per cent |
|---|---|
| Silica | 12.2 |
| Borax—dehydrated | 16.0 |
| Feldspar | 25.2 |
| Soda nitrate | 2.1 |
| Fluorspar | 5.4 |
| Cryolite | 4.7 |
| Barium carbonate | 22.3 |
| Calcspar | 4.5 |
| Antimony trioxide | 1.3 |
| Molybdenum trioxide | 6.3 |

8. A porcelain enamel frit of the character produced by smelting a raw batch mixture comprising about:

| | Per cent |
|---|---|
| Silica | 16.8 |
| Borax—dehydrated | 18.8 |
| Feldspar | 17.3 |
| Soda ash | 3.3 |
| Soda nitrate | 3.5 |
| Fluorspar | 8.1 |
| Cryolite | 4.3 |
| Barium carbonate | 20.5 |
| Antimony trioxide | 1.2 |
| Molybdenum trioxide | 6.2 |

9. A porcelain enamel frit of the character produced by smelting a raw batch mixture comprising about:

| | Per cent |
|---|---|
| Silica | 16.8 |
| Borax—dehydrated | 18.8 |
| Feldspar | 17.3 |
| Soda ash | 3.3 |
| Soda nitrate | 3.5 |
| Fluorspar | 8.1 |
| Cryolite | 4.3 |
| Barium carbonate | 20.5 |
| Antimony trioxide | 3.4 |
| Molybdenum trioxide | 4.0 |

10. A porcelain enamel frit of the character produced by smelting a raw batch mixture, the calculated oxide content of which comprises about:

| | Parts by weight |
|---|---|
| $SiO_2$ | 29.7 |
| $B_2O_3$ | 11.1 |
| $Al_2O_3$ | 5.7 |
| $Na_2O$ | 8.5 |
| $K_2O$ | 2.5 |
| CaO | 6.4 |
| $Sb_2O_3$ | 1.3 |
| $MoO_3$ | 6.3 |
| $F_2$ | 5.2 |
| BaO | 17.2 |

11. A porcelain enamel frit of the character produced by smelting a raw batch mixture, the calculated oxide content of which comprises about:

| | Parts by weight |
|---|---|
| $SiO_2$ | 28.8 |
| $B_2O_3$ | 13.0 |
| $Al_2O_3$ | 4.2 |
| $Na_2O$ | 11.4 |
| $K_2O$ | 1.7 |
| CaO | 5.8 |
| $Sb_2O_3$ | 1.2 |
| $MoO_3$ | 6.2 |
| $F_2$ | 6.2 |
| BaO | 16.1 |

12. A porcelain enamel frit of the character produced by smelting a raw batch mixture, the calculated oxide content of which comprises about:

| | Parts by weight |
|---|---|
| $SiO_2$ | 28.8 |
| $B_2O_3$ | 13.0 |
| $Al_2O_3$ | 4.2 |
| $Na_2O$ | 11.4 |
| $K_2O$ | 1.7 |
| CaO | 5.8 |
| $Sb_2O_3$ | 3.4 |
| $MoO_3$ | 4.0 |
| $F_2$ | 6.2 |
| BaO | 16.1 |

EUGENE E. BRYANT.